(12) United States Patent
Kershek (10) Patent No.: US 9,501,105 B2
(45) Date of Patent: Nov. 22, 2016

(54) KEYBOARD FOR AN ELECTRONIC DEVICE (71) Applicant: Intel Corporation, Santa Clara, CA (US)

(72) Inventor: James M. Kershek, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/040,673

(22) Filed: Sep. 28, 2013

(65) Prior Publication Data

US 2015/0092330 A1    Apr. 2, 2015

(51) Int. Cl.
*G06F 1/16* (2006.01)
*H01H 13/84* (2006.01)
*H01H 3/12* (2006.01)

(52) U.S. Cl.
CPC ........... *G06F 1/1666* (2013.01); *G06F 1/1664* (2013.01); *H01H 3/125* (2013.01); *H01H 13/84* (2013.01); *H01H 2221/068* (2013.01); *H01H 2223/052* (2013.01); *H01H 2227/036* (2013.01); *H01H 2231/002* (2013.01); *H01H 2235/006* (2013.01); *H01H 2235/026* (2013.01)

(58) Field of Classification Search
CPC ..................................... G06F 1/1666
USPC ...................................... 361/679.13
See application file for complete search history.

(56) References Cited

U.S. PATENT DOCUMENTS 3,671,822 A * 6/1972 Leno .............................. 361/288
4,954,823 A * 9/1990 Binstead .......................... 341/26
5,032,695 A * 7/1991 Mullins .......................... 200/512
5,519,569 A * 5/1996 Sellers ....................... 361/679.15
5,569,889 A   10/1996 Bruner
5,635,928 A   6/1997 Takagi et al.
5,774,384 A   6/1998 Okaya et al.
5,933,320 A * 8/1999 Malhi ........................ 361/679.55
5,971,637 A * 10/1999 Malhi et al. ................ 400/491.2
6,019,530 A * 2/2000 Lanzetta et al. ............ 400/491.1
6,331,850 B1 * 12/2001 Olodort et al. ................ 345/168
6,559,399 B2 * 5/2003 Hsu et al. ....................... 200/344
6,739,774 B1 * 5/2004 Lahr ............................... 400/495
7,997,817 B2 * 8/2011 Zou et al. ....................... 400/472
8,226,310 B2 * 7/2012 Grant et al. ................... 400/682

(Continued)

FOREIGN PATENT DOCUMENTS

GB    2520388    3/2016
JP    09-185443  7/1997

(Continued)

OTHER PUBLICATIONS

Taiwan Patent Office—Office action in TW Application No. 103133281 mailed on Aug. 7, 2015 [English Translation provided].

(Continued)

*Primary Examiner* — Adrian S Wilson (74) *Attorney, Agent, or Firm* — Patent Capital Group (57) ABSTRACT

Particular embodiments described herein provide for a keyboard that includes a plurality of keys; and a plurality of key actuators. At least a portion of the key actuators raises at least a portion of the plurality of keys when the portion of the plurality of key actuators is activated. In more particular embodiments, the dome supports comprise a dielectric that deforms in a 'z' direction with respect to the keyboard when activated to raise the portion of the plurality of keys.

22 Claims, 8 Drawing Sheets

(56) References Cited

U.S. PATENT DOCUMENTS

| | | |
|---|---|---|
| 2003/0193419 A1* | 10/2003 | Hsu .................................. 341/22 |
| 2004/0126170 A1 | 7/2004 | Hagerman |
| 2007/0171207 A1* | 7/2007 | Wernersson .................. 345/169 |
| 2008/0024963 A1* | 1/2008 | Weksler et al. ............... 361/681 |
| 2008/0185278 A1 | 8/2008 | Kikuchi |
| 2010/0321872 A1* | 12/2010 | Sip et al. .................... 361/679.2 |
| 2011/0170250 A1* | 7/2011 | Bhutani et al. ............ 361/679.2 |
| 2011/0304550 A1 | 12/2011 | Romera Jolliff et al. |
| 2012/0298491 A1 | 11/2012 | Ozias |
| 2013/0235512 A1 | 9/2013 | Chiang |

FOREIGN PATENT DOCUMENTS

| | | |
|---|---|---|
| JP | 11-259208 | 9/1999 |
| JP | 2003-248529 | 9/2003 |
| JP | 2010-257663 | 11/2010 |
| TW | 578085 | 3/2004 |
| TW | M340540 | 9/2008 |

OTHER PUBLICATIONS

Taiwan Patent Office IPO Search Report for Taiwan Invention Patent Application No. 103133281 mailed Aug. 7, 2015 [English translation provided].

United Kingdom Intellectual Property Office Action in GB Patent Application Serial No. GB1416332.3 mailed on Mar. 13, 2015.

Japan Patent Office Notice of Reasons for Rejection in JP Patent Application No. 2014-182298 mailed on Oct. 6, 2015 [English Translation provided].

United Kingdom Intellectual Property Office Action in GB Patent Application Serial No. GB1416332.3 mailed on Oct. 30, 2015.

Japan Patent Office Final Notice of Reasons for Rejection in JP Patent Application No. 2014-182298 mailed on Apr. 5, 2016.

* cited by examiner

KEYBOARD FOR AN ELECTRONIC DEVICE

TECHNICAL FIELD

Embodiments described herein generally relate to a keyboard for an electronic device.

BACKGROUND

End users have more electronic device choices than ever before. A number of prominent technological trends are currently afoot (e.g., more computing devices, thinner lighter devices, etc.), and these trends are changing the electronic device landscape. One of the technological trends is a growing demand for extremely light and thin keyboards to reduce the bulk and weight of electronic devices. Virtual keyboards (or typing on glass) are often ergonomically uncomfortable and typically do not provide an enjoyable user experience. Keyboards for convertible laptops and peripheral keyboards are often thick and cumbersome for carrying from place to place. As conventional key heights are lowered to provide thinner keyboards, the key travel becomes an issue and thin keyboards often fail to offer an acceptable user experience. Currently, keyboard designs often stifle the user's flexibility, along with hindering the overall consumer experience of the associated electronic device. Hence, there is a challenge in providing a thin lightweight keyboard that can provide a traditional keyboard typing experience.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for a keyboard that includes a plurality of keys; and a plurality of key actuators having a respective dome support. At least a portion of the key actuators raises at least a portion of the plurality of keys when the portion of the plurality of key actuators is activated. In more particular embodiments, the dome supports comprise a dielectric that deforms in a 'z' direction with respect to the keyboard when activated to raise the portion of the plurality of keys.

In yet other embodiments, the dome supports are substantially flat when the portion of the plurality of key actuators is not activated. In addition, the portion of the plurality of key actuators provides at least one haptic effect to the portion of the plurality of keys. In other example implementations, the portion of the plurality of keys has a substantially zero key travel when the portion of the plurality of key actuators is not activated. A subset of the plurality of keys can be substantially even with a surface of the keyboard when the portion of the plurality of key actuators is not activated. In certain cases, the portion of the plurality of key actuators includes a scissor key support.

Example Embodiments

The following detailed description sets forth example embodiments of apparatuses, methods, and systems relating to detachable unit configurations for an electronic device.

Features such as structure(s), function(s), and/or characteristic(s), for example, are described with reference to one embodiment as a matter of convenience; various embodiments may be implemented with any suitable one or more of the described features.

Figure 1A:
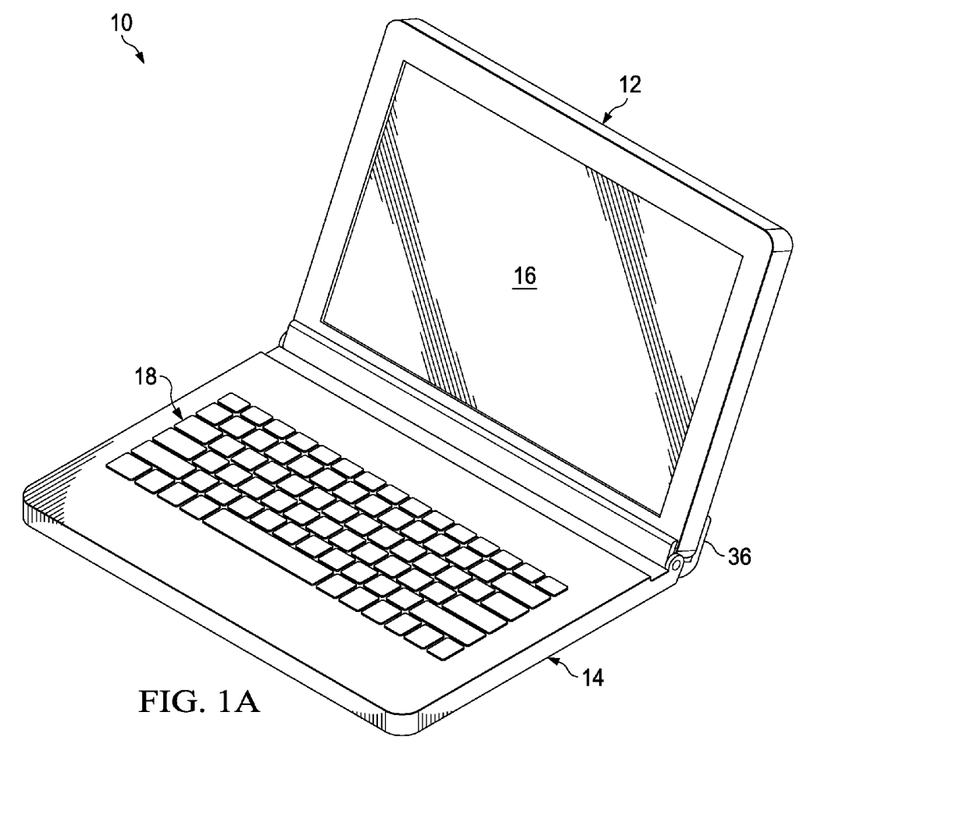
FIG. 1A is a simplified orthographic view illustrating an embodiment of an electronic device in an open clamshell configuration, in accordance with one embodiment of the present disclosure.

FIG. 1A is a simplified orthographic view illustrating an embodiment of an electronic device 10 in an open clamshell configuration in accordance with one embodiment. Electronic device 10 may include a display portion 12, a keyboard portion 14, and a hinge 36. Hinge 36 can define an axis of rotation that is shared between display portion 12 and keyboard portion 14. Hinge 36 can include connectors and mechanical retentions to provide an electrical connection between display portion 12 and keyboard portion 14. In an embodiment, a printed circuit board (PCB) interconnector is used to electrically connect the display portion 12 and keyboard portion 14. Display portion 12 can include a display 16. Keyboard portion 14 can include a keyboard 18.

In one or more embodiments, electronic device 10 is a notebook computer or laptop computer. In still other embodiments, electronic device 10 may be any suitable electronic device having a display such as a mobile device, a tablet computer and/or a tablet device (e.g., an i-Pad™, a Microsoft Surface™, Google Nexus™, etc.), phablet, a personal digital assistant (PDA), a smartphone, an audio system, a movie player of any type, a computer docking station, etc. Display 16 can be a liquid crystal display (LCD) display screen, a light-emitting diode (LED) display screen, an organic light-emitting diode (OLED) display screen, a plasma display screen, or any other suitable display screen system. In an embodiment, electronic device 10 may contain a camera, a microphone, and speakers.

In the particular embodiment shown in FIG. 1, electronic device 10 is a relatively thin and sleek clamshell computer including keyboard portion 14 and a detachable and reattachable display portion 12. Hinge 36 allows display portion 12 to be attached to keyboard portion 14 in two different orientations: display 16 facing inward (an open clamshell configuration and a closed clamshell configuration) and display 16 facing outward (a tablet configuration and a movie mode configuration). In an embodiment, display portion 12 can be configured as a standalone tablet.

Figure 1B:
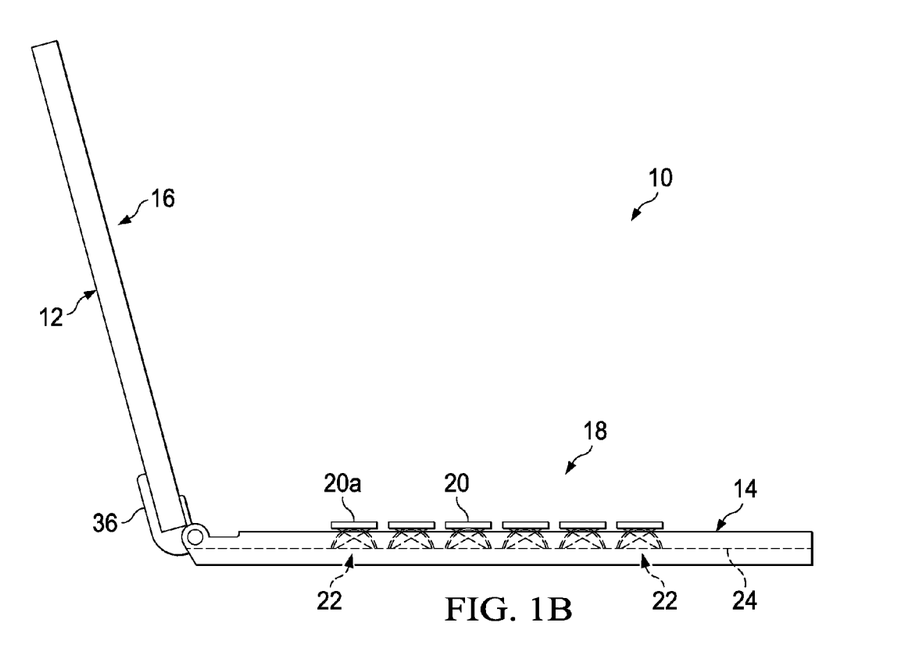
FIG. 1B is a simplified schematic diagram illustrating a side view of an electronic device in an open clamshell configuration, in accordance with one embodiment of the present disclosure.

Turning to FIG. 1B, FIG. 1B is a side view illustrating an embodiment of an electronic device 10 in an open clamshell configuration in accordance with one embodiment of the present disclosure. Electronic device 10 may include display portion 12 and keyboard portion 14. Keyboard portion 14 may include a plurality of keys 20, a plurality of key actuators 22, and a support layer 24. For illustrative purposes, one key from plurality of keys 20 has been referenced as key 20a. Each key (e.g., key 20a) may have a corresponding key actuator from plurality of key actuators 22. When plurality of key actuators 22 are activated, (for example, in an open clamshell configuration as Illustrated in FIG. 1B) they raise plurality of keys 20. Support layer 24 can provide a base and support for plurality of key actuators 22.

Figure 1C:
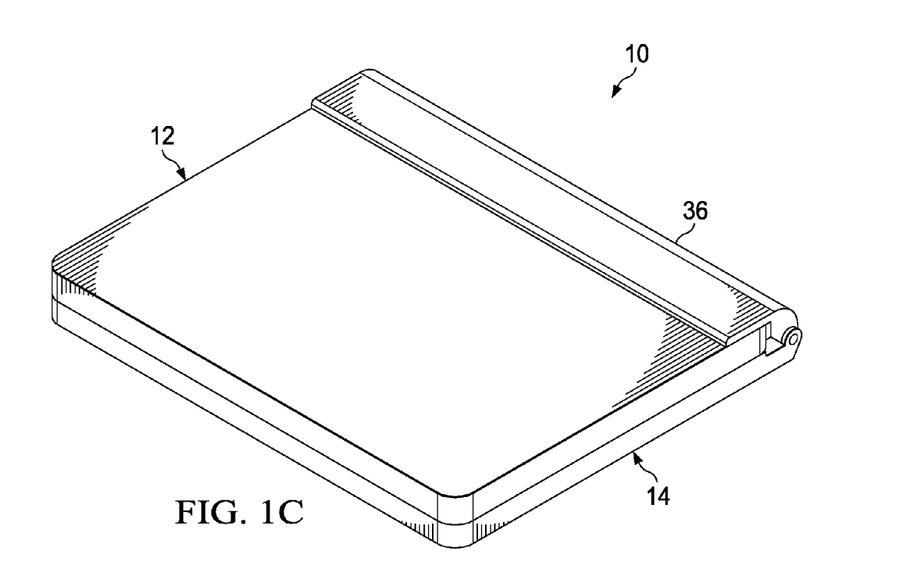
FIG. 1C is a simplified orthographic view illustrating an embodiment of an electronic device in a closed clamshell configuration, in accordance with one embodiment of the present disclosure.
Figure 1D:
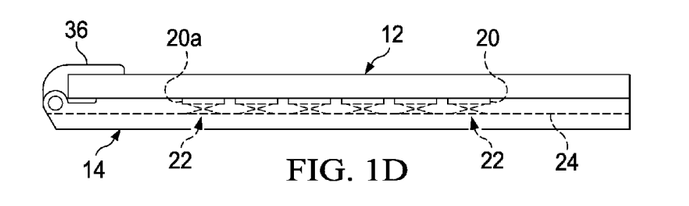
FIG. 1D is a simplified schematic diagram illustrating a side view of an electronic device in a closed clamshell configuration, in accordance with one embodiment of the present disclosure.

Turning to FIG. 1C, FIG. 1C is a simplified orthographic view illustrating an embodiment of an electronic device 10 in accordance with one embodiment of the present disclosure. As illustrated in FIG. 1C, electronic device is in a close clamshell configuration. Turning to FIG. 1D, FIG. 1D is a side view illustrating an embodiment of an electronic device 10 in a closed clamshell configuration in accordance with one embodiment of the present disclosure. When plurality of key actuators 22 are not activated, they do not raise plurality of keys 20 and thus, provide for a thin keyboard design. For example, when electronic device 10 is in a closed clamshell configuration, plurality of key actuators 22 are not activated (as illustrated in FIG. 1D). The height of plurality of keys 20 when electronic device 10 is in a closed clamshell configuration is less than the height of plurality of keys 20 when electronic device is in an open clamshell configuration and plurality of key actuators 22 are activated (as illustrated in FIG. 1B).

In general terms, plurality of key actuators 22 can each include a dome support (e.g., a polymer, dielectric, or other material) that deforms in the 'z' direction when activated to raise plurality of keys 20. Each key actuator in plurality of key actuators 22 can have sufficient blocking force to provide a user experience similar to that of current rubber dome solutions and may optionally provide haptic effects (e.g., forces, vibrations, or motions to the user) to enhance user experience. When plurality of key actuators 22 are deactivated (e.g., the lid of the laptop is closed), plurality of key actuators 22 can lay flat (or relatively flat) on support layer 24, thus providing zero key travel and a thin keyboard design.

For purposes of illustrating certain example features of electronic devices 10, the following foundational information may be viewed as a basis from which the present disclosure may be properly explained. There is a growing demand for extremely light and thin keyboards to reduce the bulk and weight of delivering a good touch typing experience. However, traditionally, thin keyboard configurations fail to offer an acceptable user experience. Virtual keyboards that require typing on glass (or some other material) are often ergonomically uncomfortable. Furthermore, peripheral keyboards (e.g., Bluetooth keyboards) are often thick and cumbersome for carrying from place to place. Currently, keyboard designs often stifle a user's flexibility, along with hindering the overall consumer experience of the associated electronic device. Attempts to resolve the problem do not reduce keyboard z-height while still providing acceptable key travel. In addition, current thin keyboard configurations typically do not have individual key haptic effects for a physical keyboard. One current solution is to use a scissor mechanism along with a collapsible rubber dome. The key drawback of this approach is z-height limitations of the collapsible rubber dome which cannot allow for zero (or very low) key travel. Other solutions utilize a 'ramp and magnet' approach which uses key travel in the "y" dimension to simulate further key travel in the z-dimension. However, this approach can produce unnatural key travel. In addition, haptic effects are not provided.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device can include a keyboard assembly where the collapsible rubber dome mechanism of a traditional keyboard are replaced with a dome support (e.g., a polymer, dielectric, or other material) that deforms in the 'z' direction when activated (e.g., charged with an electric current) and has sufficient blocking force to provide a user experience similar to that of current rubber dome solutions. The dome support may be a part of a plurality of key actuators and can provide haptic effects (e.g., forces, vibrations, or motions to the user) when pressed or in other instances to enhance the experience of the user. In an embodiment, the electronic device may be a clamshell computer. When the electronic device is in a closed clamshell configuration, the dome support may not be activated and can lay flat against a support layer. This allows for zero, about zero, or very low key travel as opposed to current solutions which remain at full key travel height when the electronic device is in the closed clamshell configuration. This can allow electronic device 10 to provide a user experience that replicates a more traditional computer keyboard experience where the key travel may feel like a common computer keyboard while providing a thinner keyboard design. Hence, the design can enable thinner keyboard designs while not compromising on key travel.

In a particular embodiment, electronic device 10 can include an 18.5 mm pitch full-size keyboard that provides for an optimal touch-typing experience. Moreover, there can be enough separation between the keys to make it easier for touch-typers to distinguish between the keys for an improved touch-typing experience. In operation, when electronic device 10 is in a closed clamshell configuration, the keyboard portion can protect the display, the plurality of key actuators may not be activated and the keys may have zero, about zero, or very little travel to allow for a thin profile. When the display portion is flipped up to an open clamshell configuration, the keyboard can operate as a traditional keyboard where the plurality of key actuators are activated and the keys are raised (using the dome support) and can function as a traditional keyboard. When the display portion is flipped upside-down to face outwardly away from the keyboard, electronic device 10 can operate in a tablet configuration. In an embodiment, while in the tablet configuration, the keyboard portion can be nested or stowed behind the display and out of the way of user interaction. The plurality of key actuators may not be activated and the keys may have zero, about zero, or very little travel to allow for a thin profile. In the tablet configuration, the display can still be flipped up and in this configuration, the keyboard portion can operate as a stand (behind the display), and electronic device 10 can be in a movie mode configuration. In this configuration, depending on the user's preference, the plurality of key actuators may not be activated and the keys may have zero, about zero, or very little travel to allow for a thin profile or the plurality of key actuators are activated and the keys are raised and can function as a traditional keyboard. When the display portion is detached from the keyboard portion, the display portion can function as a tablet by itself. To allow for a thin profile of the keyboard portion for storage or stowing, the plurality of key actuators may not be activated and the keys may have zero, about zero, or very little travel.

The keyboard can include a keyboard body reflective of a unibody-molded part that may use insert and/or comolding methods to eliminate visible fasteners. In addition, the keyboard body may further include insert-molded band features to provide stiffness to the outer portion of the scoop geometry as well as transmit rotational loads, which inhibit the display portion from rotating with respect to the keyboard portion.

For the actual keys (in the plurality of keys), in a particular non-limiting embodiment, the keys can be configured with a 0.5 mm travel distance or some other travel distance that will allow for a traditional keyboard feel. In addition, haptic effects can be used to enhance the experience for the user by applying forces, vibrations, or motions to the user. For example, tactile feedback can be provided (e.g., 70 gram with "cliff drop" force deflection feel) to mimic the typing experience of traditional keyboards. In certain implementations, there is little (or no) dead space on the keyboard surface. There can be various types of keys on the keyboard. For example, the keyboard can include pivoting keys (e.g., tilde, tab, caps lock, shift, left ctrl, backspace, backslash, enter, shift, etc.), rocking keys such as the arrow keys, and substantially vertical travel keys such as function keys and other keys.

In a particular embodiment, the keyboard portion is ultra-thin (e.g., 3.30 mm) and ultra-light (e.g., 275 grams) with sufficient keyboard band stiffness and strength to serve as a tablet device cover. The keyboard portion can be made from a laminate construction that uses variations of key design shapes and material to replicate a touch-typing user experience with the feel of a typical computer keyboard. In order to account for the thinner side areas of the keyboard device, the keyboard edge keys may be pivoted on one side. The keys can be of any suitable type such as toggle operation keys, for example, with an arrow key operation that merges four keys that cannot move diagonally.

In operation, the spacing between the plurality of keys in the keyboard can enable a touch-typer to easily distinguish between the keys using their fingers. Edge keys can be specially designed for thinner sides. An edge key configuration allows keys to hang over the edge of the keyboard to accommodate the thinner sides of the keyboard portion.

The keyboard can also provide a keypress confirming the depression of a key. In certain implementations, when the plurality of key actuators are activated, the plurality of keys are biased upward which can trigger a keypress. For the actual keyboard construction, a laminate construction may be employed in conjunction with an injection mold, where the metal is integrated into the plastic. A flexible printed circuit board (FPC) can also be used in certain embodiments of the present disclosure. Connections can be formed to the bands and a small battery may be optionally inserted into keyboard portion to provide a limited backup power supply. Keyboard portion can include any suitable dimensions, sizes, and shapes: all of which are encompassed by the present disclosure.

Note that any number of connectors (e.g., Universal Serial Bus (USB) connectors (e.g., in compliance with the USB 3.0 Specification), Thunderbolt™ connectors, WiFi connectors, a non-standard connection point such as a docking connector, etc.) and a plurality of antennas can be provisioned in conjunction with electronic device 10. [Thunderbolt™ and the Thunderbolt logo are trademarks of Intel Corporation in the U.S. and/or other countries.] The antennas are reflective of electrical components that can convert electric currents into radio waves. In particular examples, the antennas can be associated with WiFi activities, wireless connections more generally, small cell deployments, Bluetooth, 802.11, etc.

In at least one example embodiment, the motherboard of electronic device 10 is a general circuit board that can hold various components of the internal electronic system of electronic device 10. The components may include a central processing unit (CPU), a memory, etc. The motherboard can also couple to one or more connectors in order to accommodate other peripherals sought to be used by the user of electronic device 10. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. The SOC may contain digital, analog, mixed-signal, and often radio frequency functions: all of which may be provided on a single chip substrate.

Figure 2:
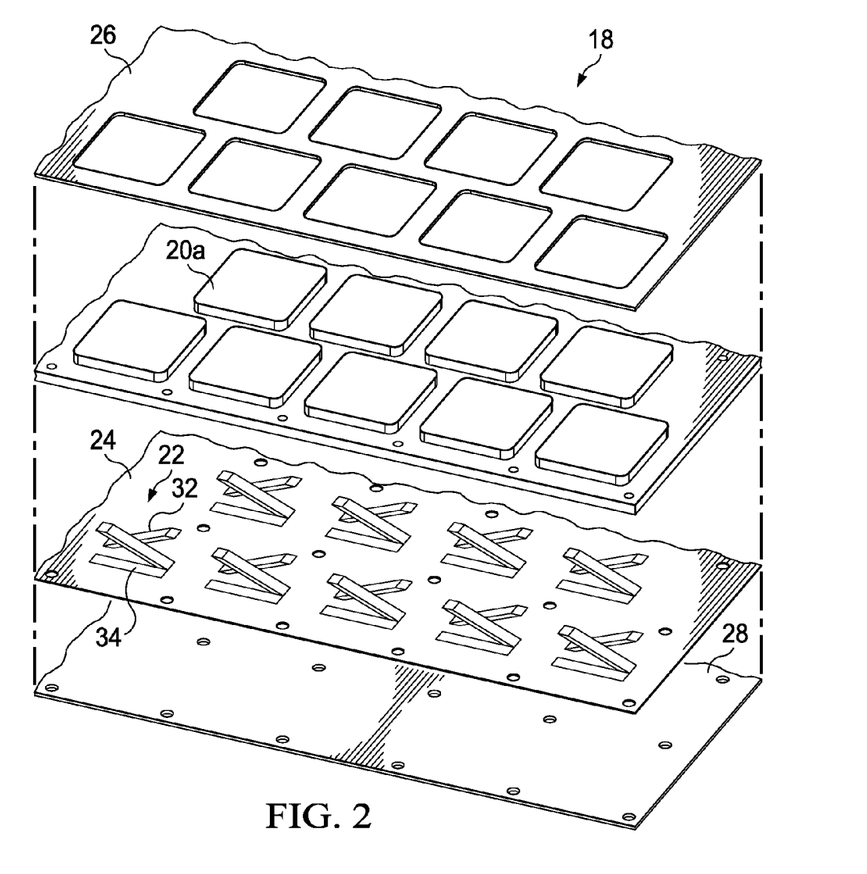
FIG. 2 is a simplified exploded view illustrating an embodiment of a keyboard of an electronic device in accordance with one embodiment of the present disclosure.

Turning to FIG. 2, FIG. 2 is a simplified exploded view diagram illustrating an orthographic view of keyboard 18 of electronic device 10. In this particular embodiment, keyboard 18 includes top web 26, plurality of keys 20, a support layer 24, and a base layer 28. Support layer 24 can include plurality of actuators 22. Each actuator in plurality of actuators 22 can include a scissor key support 32 and a dome support 34. As illustrated in FIG. 2, dome support 34 is not activated and is flat against support layer 24. When activated, each dome support 34 can raise and lift each corresponding key in plurality of keys 20. Scissor key support 32 can help guide key 20a when it is pressed, provide support, and add stability or stiffness to key 20a and allow for a natural feel when typing.

Figure 3A:
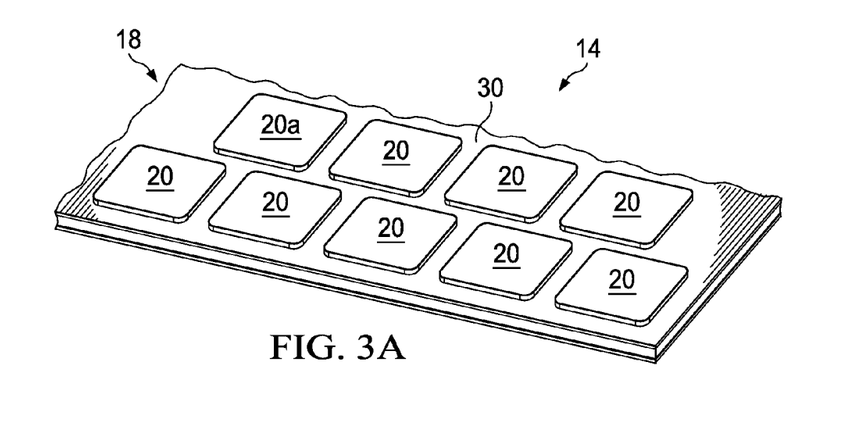
FIG. 3A is a simplified orthographic view illustrating an embodiment of a portion of a keyboard of an electronic device in accordance with one embodiment of the present disclosure.

FIG. 3A is a simplified orthographic view diagram illustrating an orthographic view of keyboard 18 when electronic device 10 is in an open clamshell configuration or an embodiment of a movie mode configuration where plurality of keys 20 are raised above a surface 30 of keyboard 18. Each key (e.g., key 20a) in plurality of keys 20 can be supported by a corresponding key actuator from plurality of key actuators 22 which lifts or raises each key above surface 30. For example, when charged with an electrical current, dome support 34 may deform in the z direction and raise key 20a above surface 30.

Figure 3B:
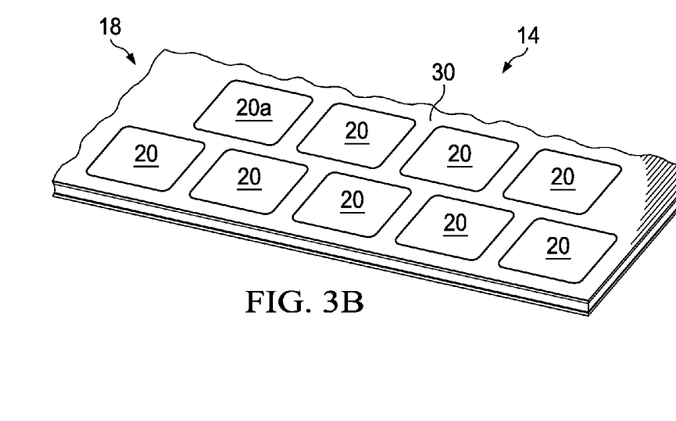
FIG. 3B is a simplified orthographic view illustrating an embodiment of a portion of a keyboard of an electronic device in accordance with one embodiment of the present disclosure.

FIG. 3B is a simplified orthographic view diagram illustrating an orthographic view of keyboard 18 when electronic device 10 is in a closed clamshell configuration, tablet configuration, or an embodiment of a movie mode configuration. As illustrated in FIG. 3B, plurality of keys 20 are relatively flat or relatively flush with surface 30 of keyboard 18. Each key actuator in plurality of key actuators 22 is not activated and is relatively flat against support layer 24.

Figure 4A:
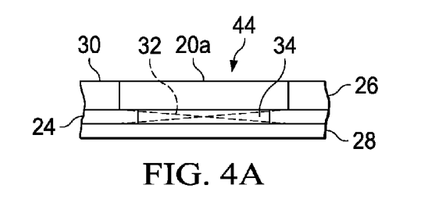
FIG. 4A is a simplified schematic diagram illustrating a side view of a key of the keyboard in accordance with one embodiment of the present disclosure.

FIG. 4A is a side view of key 20a when electronic device 10 is in a closed clamshell configuration, tablet configuration, or an embodiment of a movie mode configuration. As illustrated in FIG. 4A, a top surface 44 of key 20a is flat or flush with surface 30 of keyboard 18. Dome support 34 is not activated (e.g., charged with an electrical current) and is relatively flat or even with support layer 24.

Figure 4B:
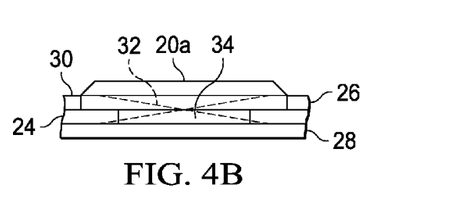
FIG. 4B is a simplified schematic diagram illustrating a side view of a key of the keyboard in accordance with one embodiment of the present disclosure.

FIG. 4B is a side view of key 20a from plurality of keys 20 when electronic device 10 is in a closed clamshell configuration, tablet configuration, or an embodiment of a movie mode configuration. As illustrated in FIG. 4B, key 20a may have an angled or curved profile to enhance the appearance or natural feel of key 20a. In this embodiment, a portion of key 20a is above surface 30 of keyboard 18. Dome support 34 is not activated (e.g., charged with an electrical current) and is relatively flat or even with support layer 24.

Figure 4C:
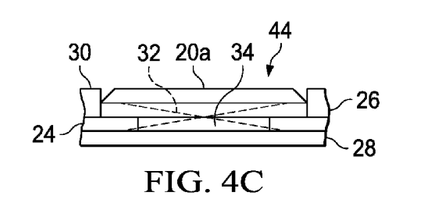
FIG. 4C is a simplified schematic diagram illustrating a side view of a key of the keyboard in accordance with one embodiment of the present disclosure.

FIG. 4C is a side view of key 20a from plurality of keys 20 when electronic device 10 is in a closed clamshell configuration, tablet configuration, or an embodiment of a movie mode configuration. As illustrated in FIG. 4C, key 20a may have an angled or curved profile to enhance the appearance or natural feel of key 20a. In this embodiment, top surface 44 of key 20a is flat or flush with surface 30 of keyboard 18.

Figure 4D:
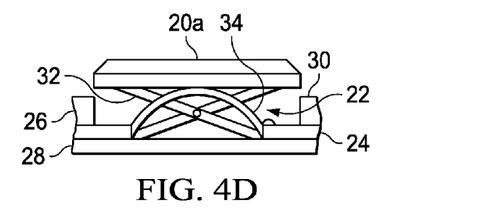
FIG. 4D is a simplified schematic diagram illustrating a side view of a key of the keyboard in accordance with one embodiment of the present disclosure.

FIG. 4D is a side view of key 20a in an open clamshell configuration or an embodiment of a movie mode configuration where plurality of keys 20 are raised from surface 30. As illustrated in FIG. 4D, dome support 34 has been activated (e.g., charged with an electrical current). As a result of being activated, dome support 34 has deformed in the z direction raising key 20a above surface 30. Scissor key support 32 can help guide key 20a when it is pressed, provide support, and add stability or stiffness to key 20a and allow for a natural feel when typing.

Figure 5A:
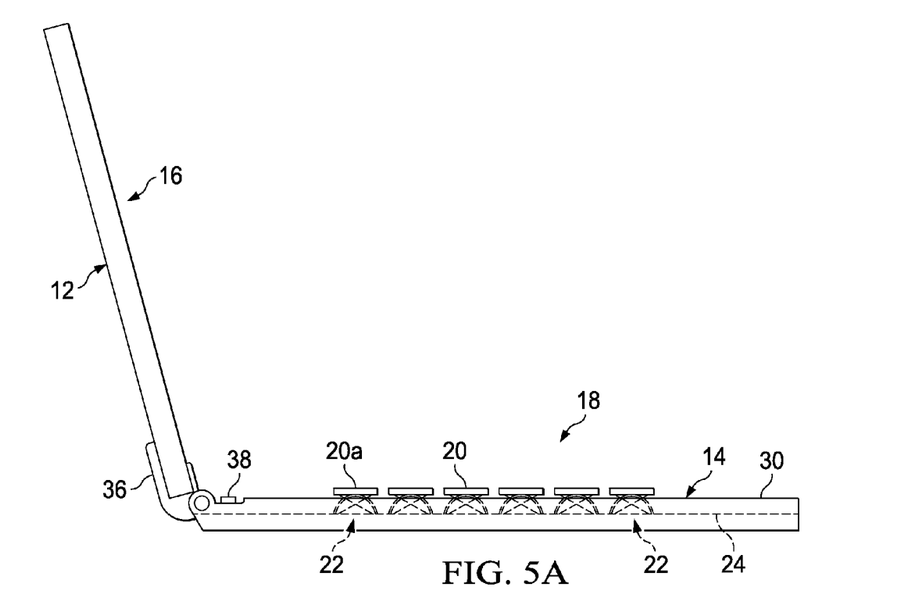
FIG. 5A is a simplified schematic diagram illustrating a side view of an electronic device in an open clamshell configuration, in accordance with one embodiment of the present disclosure.

Turning to FIG. 5A, FIG. 5A is a side view illustrating an embodiment of an electronic device 10 in an open clamshell configuration in accordance with one embodiment of the present disclosure. Electronic device 10 may include display portion 12 and keyboard portion 14. Keyboard portion 14 may include keyboard 18 and dome support activation mechanism 38. Dome support activation mechanism 38 can be configured to activate plurality of key actuators 22 when hinge 36 is removed from dome support activation mechanism 38 and raise plurality of keys 20 above surface 30 of keyboard 18. For example, as illustrated in FIG. 5A, dome support activation mechanism 38 has been activated, thus activating dome support 34 and raising plurality of keys 20 above surface 30 of keyboard 18.

Figure 5B:
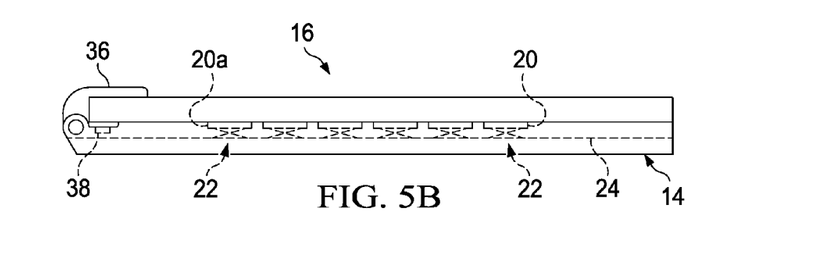
FIG. 5B is a simplified schematic diagram illustrating a side view of an electronic device in a closed clamshell configuration or a tablet configuration, in accordance with one embodiment of the present disclosure.

Turning to FIG. 5B, FIG. 5B is a simplified orthographic view illustrating an embodiment of an electronic device 10 in accordance with one embodiment of the present disclosure. As illustrated in FIG. 5B, electronic device 10 is in a close clamshell configuration (display 16 (not shown) facing inward) or a tablet configuration (display 16 (not shown) facing outward). Dome support activation mechanism 38 is not activated as hinge 36 is in contact with dome support activation mechanism 38 and plurality of keys 20 are flat or flush with surface 30 of keyboard 18.

Figure 5C:
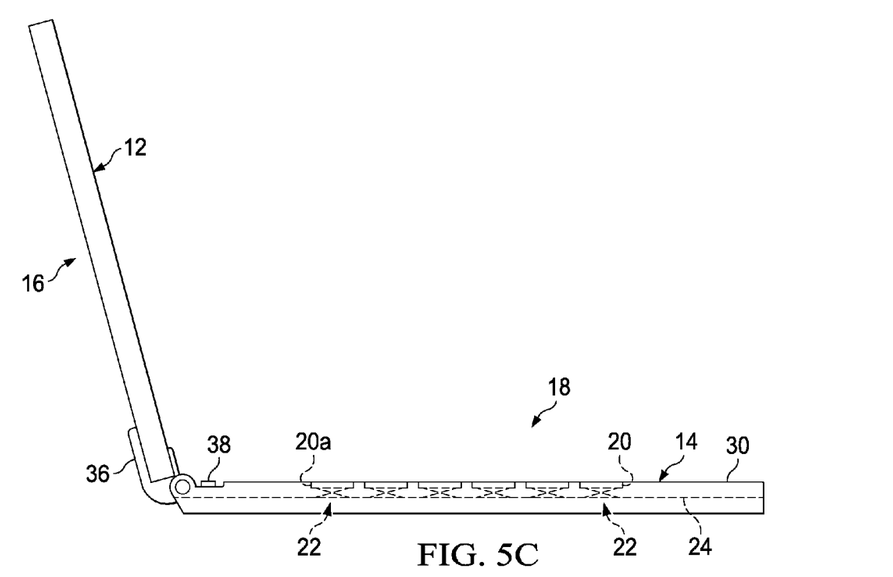
FIG. 5C is a simplified schematic diagram illustrating a side view of an electronic device in an open clamshell configuration, in accordance with one embodiment of the present disclosure.

Turning to FIG. 5C, FIG. 5C is a simplified orthographic view illustrating an embodiment of an electronic device 10 in accordance with one embodiment of the present disclosure. As illustrated in FIG. 5B, electronic device 10 is in a movie mode configuration. Dome support activation mechanism 38 can be a toggle switch that a user can activate and deactivate. As illustrated in FIG. 5C, dome support activation mechanism 38 is not activated and plurality of keys 20 are flat or flush with surface 30 of keyboard 18. If the user activated dome support activation mechanism 38, then plurality of key actuators 22 would become activated and dome support 34 would deform in the z direction and raise each key (e.g., key 20a) in plurality of keys 20 above surface 30.

Figure 6:
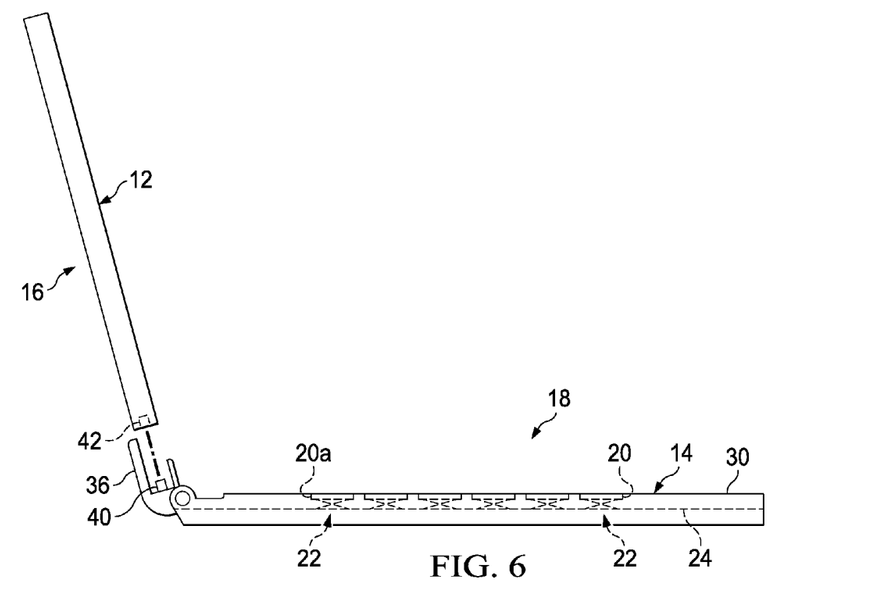
FIG. 6 is a simplified schematic diagram illustrating a side view of an electronic device in an open clamshell configuration, in accordance with one embodiment of the present disclosure.

Turning to FIG. 6, FIG. 6 is a side view illustrating an embodiment of an electronic device 10 in a detached configuration (where display portion 12 is separated from keyboard portion 14) in accordance with one embodiment of the present disclosure. Hinge 36 may include a keyboard interconnect 40. Display portion 12 may include a display interconnect 42. Keyboard interconnect 40 may be a PCB interconnector.

When display portion 12 is connected to keyboard portion 14, an electrical current and signals can be passed between keyboard interconnect 40 and display interconnect 42 to recharge an on-board battery or capacitor, power any number of items (e.g., display 16, wireless communication circuitry such as a wireless module, a camera, speakers, etc.), and provide a communication path between display portion 12 and keyboard portion 14. In other examples, electrical current and signals can be passed through a plug-in connector (e.g., whose male side protrusion connects to display portion 12 and whose female side connects to keyboard portion 14 or vice-verse) or a wireless connector (e.g., WiFi, Bluetooth, Wireless Display (WiDi), etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure. When electronic device 10 in a detached configuration, a signal may be sent to deactivate plurality of key actuators 22 so plurality of keys 20 are flat or flush with surface 30 of keyboard 18.

Figure 7:
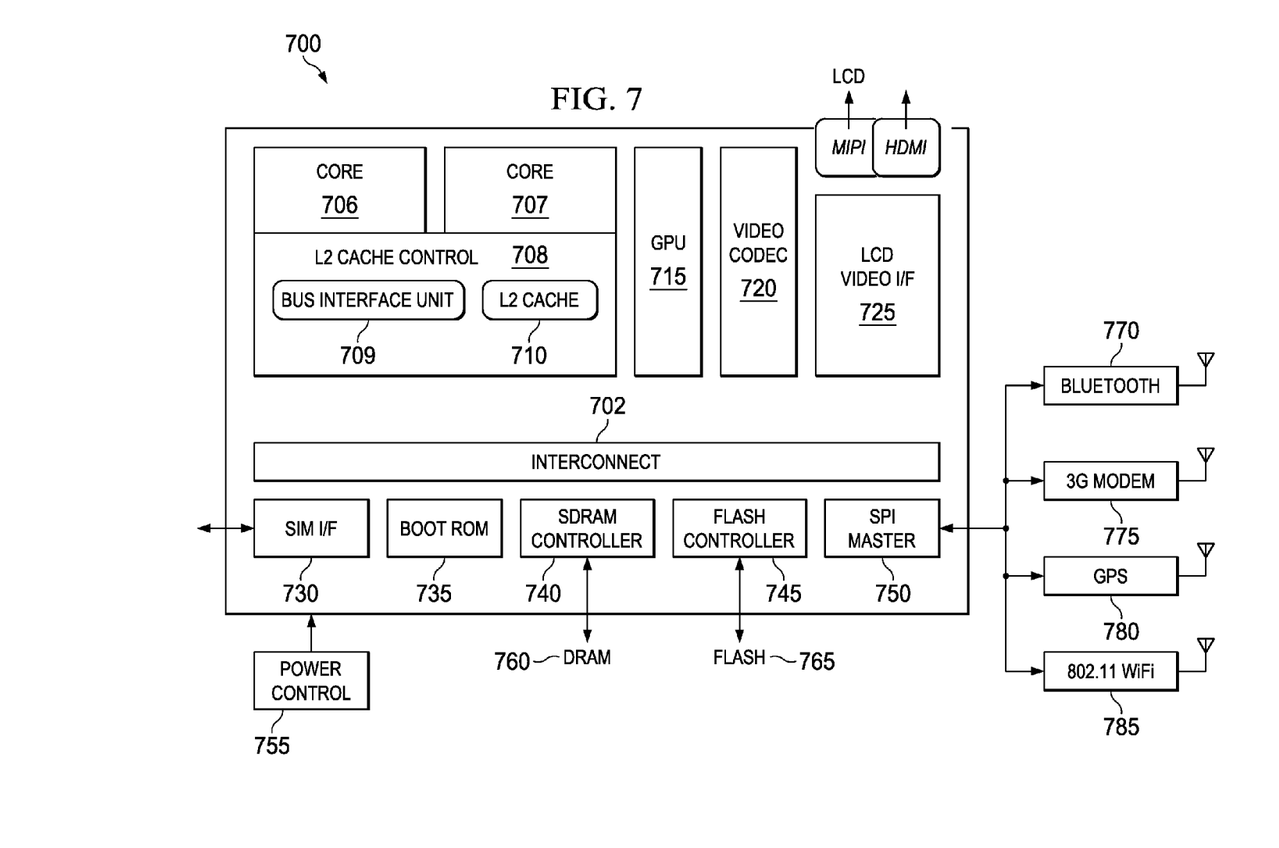
FIG. 7 is a simplified block diagram associated with an example ARM ecosystem system on chip (SOC) of the present disclosure.

FIG. 7 is a simplified block diagram associated with an example ARM ecosystem SOC 700 of the present disclosure. At least one example implementation of the present disclosure can include the keyboard design features discussed herein and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 WiFi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
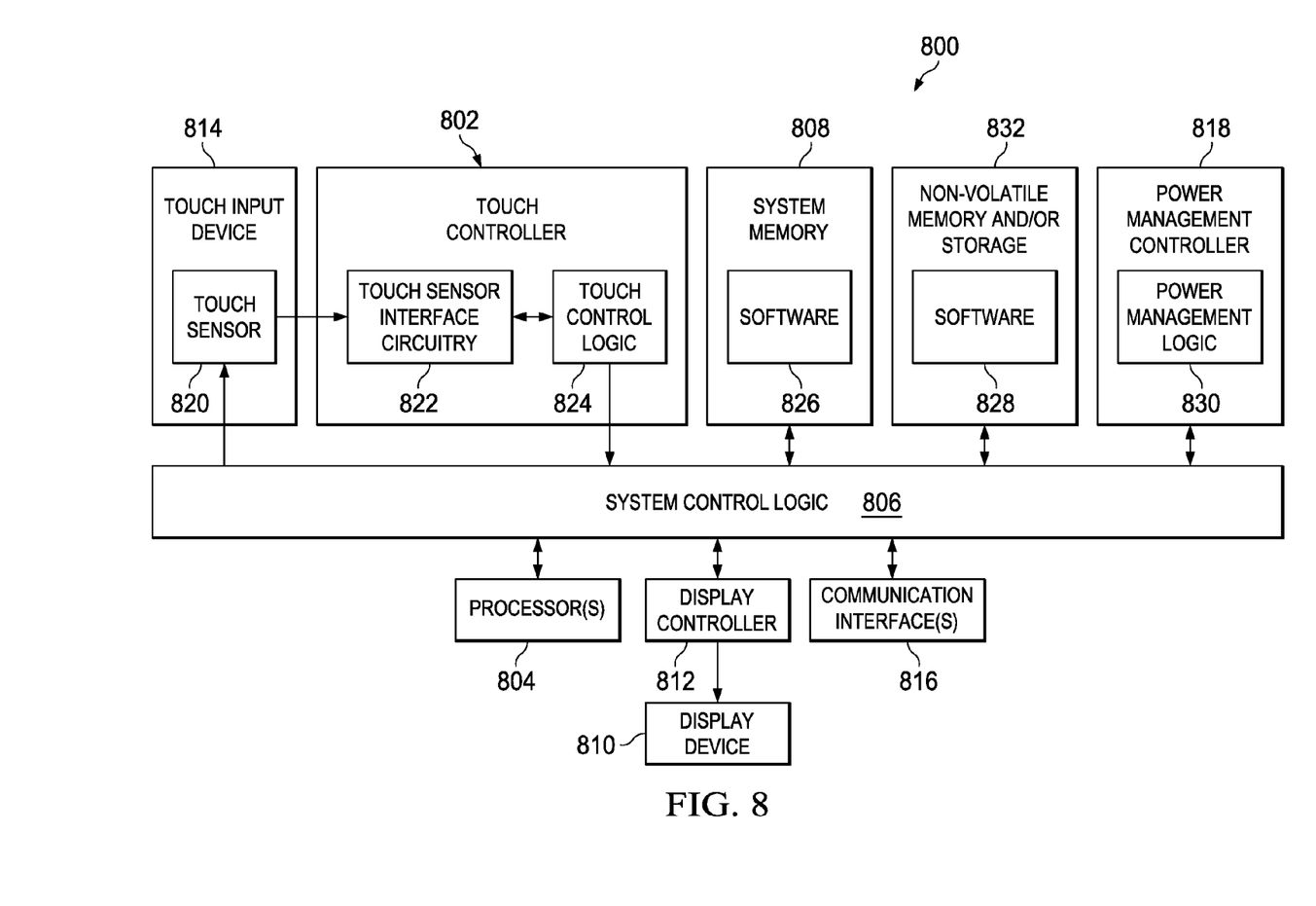
FIG. 8 is a simplified block diagram illustrating example logic that may be used to execute activities associated with the present disclosure.

FIG. 8 is a simplified block diagram illustrating potential electronics and logic that may be associated with any of the keyboard design features discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 832, display controller 812 coupled to a display device 810, power management controller 818 coupled to system control logic 806, and/or communication interfaces 816 coupled to system control logic 806.

System control logic 806, in at least one embodiment, can include any suitable interface controllers to provide for any suitable interface to at least one processor 804 and/or to any suitable device or component in communication with system control logic 806. System control logic 806, in at least one example embodiment, can include one or more memory controllers to provide an interface to system memory 808. System memory 808 may be used to load and store data and/or instructions, for example, for system 800. System memory 808, in at least one example embodiment, can include any suitable volatile memory, such as suitable dynamic random access memory (DRAM) for example. System control logic 806, in at least one example embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions disclosed herein or any part thereof. In at least one example embodiment, power management controller 818 is configured to reduce the power consumption of components or devices of system 800 that may either be operated at reduced power or turned off when the electronic device is in a closed configuration. For example, in at least one example embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem.

System control logic 806, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 804 may be packaged together with logic for one or more controllers of system control logic 806. In at least one example embodiment, at least one processor 804 may be packaged together with logic for one or more controllers of system control logic 806 to form a System in Package (SiP). In at least one example embodiment, at least one processor

804 may be integrated on the same die with logic for one or more controllers of system control logic 806. For at least one example embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Particular embodiments described herein provide for a keyboard that includes a plurality of keys; and a plurality of key actuators having a respective dome support. At least a portion of the key actuators raises at least a portion of the plurality of keys when the portion of the plurality of key actuators is activated. In more particular embodiments, the dome supports comprise a dielectric that deforms in a 'z' direction with respect to the keyboard when activated to raise the portion of the plurality of keys.

In yet other embodiments, the dome supports are substantially flat when the portion of the plurality of key actuators is not activated. In addition, the portion of the plurality of key actuators provides at least one haptic effect to the portion of the plurality of keys. In other example implementations, the portion of the plurality of keys has a substantially zero key travel when the portion of the plurality of key actuators is not activated. A top portion (i.e., a subset) of the plurality of keys can be substantially even with a surface of the keyboard when the portion of the plurality of key actuators is not activated. In certain cases, the portion of the plurality of key actuators includes a scissor key support.

In certain example embodiments, a system is provided and includes means for activating a plurality of key actuators corresponding to a plurality of keys in a keyboard, where at least a portion of the key actuators is to raise at least a portion of the plurality of keys when the portion of the plurality of key actuators is activated; and a means for deactivating the portion of the plurality of key actuators, where the deactivating of the portion of the plurality of key actuators causes the portion of the plurality of keys to lower.

In more particular embodiments, at least some of the plurality of key actuators include a respective dome support that comprises a dielectric that deforms in a 'z' direction with respect to the keyboard when activated to raise the portion of the plurality of keys. Additionally, in other embodiments, at least some of the dome supports are substantially flat when the portion of the plurality of key actuators is not activated. Also, the portion of the plurality of key actuators can provide at least one haptic effect to the portion of the plurality of keys. In certain cases, the plurality of key actuators have a respective dome support that comprises a dielectric or a polymer.

What is claimed is:

1. A keyboard, comprising:
a plurality of keys;
a top web, wherein the top web is located between each of the plurality of keys; and
a plurality of key actuators, wherein each of the plurality of key actuators are associated with one of the plurality of keys and includes a scissor key support and a dome support, wherein the dome support is to raise an associated key above the top web support when the dome support is activated by an electrical current.

2. The keyboard of claim 1, wherein the dome support includes a dielectric that deforms in a 'z' direction with respect to the keyboard when activated.

3. The keyboard of claim 2, wherein the dome support is substantially flat when the dome support is not activated.

4. The keyboard of claim 1, wherein a portion of the plurality of key actuators is to provide at least one haptic effect to the portion of the plurality of keys.

5. The keyboard of claim 1, wherein the portion of the plurality of keys have a substantially zero key travel when the dome support is not activated.

6. The keyboard of claim 1, wherein a subset of the plurality of keys is substantially even with a surface of the keyboard when the dome support is not activated.

7. An electronic device, comprising:
a display portion;
a keyboard that comprises:
a plurality of keys;
a top web, wherein the top web is located between each of the plurality of keys; and
a plurality of key actuators, wherein each of the plurality of key actuators are associated with one of the plurality of keys and includes a scissor key support and a dome support, wherein the dome support is to raise an associated key above the top web support when the dome support is activated by an electrical current.

8. The electronic device of claim 7, wherein a subset of the plurality of keys is substantially even with a surface of the keyboard when the electronic device is in a closed configuration or a tablet configuration.

9. The electronic device of claim 7, wherein the dome support is to be activated when the electronic device is in an open configuration.

10. The electronic device of claim 7, further comprising:
a dome support activation mechanism configured to activate the dome support; and
a hinge that couples the display portion to the keyboard.

11. The electronic device of claim 10, wherein the dome support activation mechanism is to deactivate the dome support when the display portion is removed from the keyboard.

12. The electronic device of claim 10, wherein the dome support activation mechanism comprises a toggle mechanism.

13. A method, comprising:
activating a plurality of dome supports corresponding to a plurality of keys in a keyboard, wherein at least a portion of the plurality of dome supports are to raise at least a portion of the plurality of keys above a top web support when the plurality of dome supports are activated by an electrical current, wherein the top web is located between each of the plurality of keys; and
deactivating the plurality of dome supports, wherein the deactivating of the plurality of dome supports causes the portion of the plurality of keys to lower.

14. The method of claim 13, wherein at least some of the plurality of dome supports comprises a dielectric that deforms in a 'z' direction with respect to the keyboard when activated.

15. The method of claim 14, wherein at least some of the plurality of dome supports are substantially flat when the plurality of dome supports is not activated.

16. The method of claim 13, wherein the plurality of dome supports are to provide at least one haptic effect to the portion of the plurality of keys.

17. The method of claim 13, wherein the portion of the plurality of keys have a substantially zero key travel when the plurality of dome supports are not activated.

18. A system, comprising:
means for activating a plurality of dome supports corresponding to a plurality of keys in a keyboard, wherein at least a portion of the key actuators is to raise at least a portion of the plurality of keys above a top web support when the plurality of dome supports are activated by an electrical current, wherein the top web is located between each of the plurality of keys; and
means for deactivating the plurality of dome supports, wherein the deactivating of the plurality of dome supports causes the portion of the plurality of keys to lower.

19. The system of claim 18, wherein at least some of the plurality of dome supports include a dielectric that deforms in a 'z' direction with respect to the keyboard when activated to raise the portion of the plurality of keys, and wherein at least some of the dome supports are substantially flat when the portion of the plurality of key actuators is not activated.

20. The system of claim 18, wherein the plurality of dome supports are to provide at least one haptic effect to the portion of the plurality of keys.

21. The system of 18, wherein each of the plurality of dome supports includes a dielectric or a polymer.

22. The keyboard of claim 1,
wherein a dome support is associated with a specific key, wherein the specific key is one of the plurality of keys, and wherein the electrical current causes the dome support to raise the specific key.

* * * * *

UNITED STATES PATENT AND TRADEMARK OFFICE
CERTIFICATE OF CORRECTION

Page 1 of 1

PATENT NO. : 9,501,105 B2
APPLICATION NO. : 14/040673
DATED : November 22, 2016
INVENTOR(S) : James M. Kershek It is certified that error appears in the above-identified patent and that said Letters Patent is hereby corrected as shown below:

In the Claims

In Column 14, Line 55, in Claim 21, before "18," insert -- claim --.

Signed and Sealed this
First Day of May, 2018

Andrei Iancu
*Director of the United States Patent and Trademark Office*